US011124283B1

(12) United States Patent
Kennedy (10) Patent No.: US 11,124,283 B1
(45) Date of Patent: Sep. 21, 2021

(54) WING IN GROUND EFFECT VEHICLE (71) Applicant: Adam Wade Kennedy, Sandy, OR (US)

(72) Inventor: Adam Wade Kennedy, Sandy, OR (US)

(*) Notice: Subject to any disclaimer, the term of this patent is extended or adjusted under 35 U.S.C. 154(b) by 273 days.

(21) Appl. No.: 16/449,197

(22) Filed: Jun. 21, 2019

Related U.S. Application Data

(60) Provisional application No. 62/689,212, filed on Jun. 24, 2018.

(51) Int. Cl.
| B64C 1/06 | (2006.01) |
| B64C 25/54 | (2006.01) |
| B64C 1/26 | (2006.01) |
| B64C 1/00 | (2006.01) |

(52) U.S. Cl.
CPC ............... *B64C 1/061* (2013.01); *B64C 1/26* (2013.01); *B64C 25/54* (2013.01); *B64C 2001/0045* (2013.01); *B64C 2211/00* (2013.01)

(58) Field of Classification Search
CPC .......... B64C 1/061; B64C 25/54; B64C 1/26; B64C 2001/0045; B64C 2211/00
See application file for complete search history.

(56) References Cited

U.S. PATENT DOCUMENTS

| 1,815,341 | A | * | 7/1931 | Zaharoff | ................. | B64C 11/00 |
| | | | | | | 244/55 |
| 5,897,078 | A | * | 4/1999 | Burnham | .............. | B64C 1/0009 |
| | | | | | | 244/117 R |
| 6,126,113 | A | * | 10/2000 | Navickas | .................. | B64C 1/06 |
| | | | | | | 244/120 |
| 6,405,977 | B1 | * | 6/2002 | Ash | ........................ | B64D 33/02 |
| | | | | | | 244/53 B |
| 8,272,596 | B2 | * | 9/2012 | Meekins | ................. | B64C 35/00 |
| | | | | | | 244/101 |
| 9,580,172 | B2 | * | 2/2017 | Hobart | .................... | B60F 5/006 |
| 2001/0011691 | A1 | * | 8/2001 | Provost | ................. | B64D 27/12 |
| | | | | | | 244/55 |
| 2006/0091258 | A1 | * | 5/2006 | Chiu | ........................ | B64C 1/30 |
| | | | | | | 244/119 |
| 2006/0162638 | A1 | * | 7/2006 | Boncodin | ................ | B60V 1/04 |
| | | | | | | 114/272 |
| 2010/0276538 | A1 | * | 11/2010 | Helou, Jr. | ............... | B64C 39/02 |
| | | | | | | 244/118.1 |
| 2011/0046821 | A1 | * | 2/2011 | Grabowsky | ............. | B64C 39/00 |
| | | | | | | 701/3 |
| 2013/0126666 | A1 | * | 5/2013 | Brown | ...................... | B60F 5/02 |
| | | | | | | 244/2 |
| 2018/0086458 | A1 | * | 3/2018 | Sartorius | ............... | B64C 39/024 |
| 2018/0273158 | A1 | * | 9/2018 | Courtin | ..................... | B64C 1/26 |

\* cited by examiner

*Primary Examiner* — Assres H Woldemaryam (57) ABSTRACT

A modular wing in ground effect vehicle has a fuselage which receives interchangeable cockpit and component modules and may accept a variety of snap-on wing styles and control surfaces for various flying conditions and pilot skill levels. When depleted or due for repairs, modules containing stored energy components or machinery subject to wear or periodic maintenance may be exchanged for fresh units so that a vehicle requiring such an exchange may be returned to service quickly and conveniently.

20 Claims, 7 Drawing Sheets

Fig. 6b

WING IN GROUND EFFECT VEHICLE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This non-provisional utility application claims the benefit of and priority to U.S. Provisional Application 62/689,212 "Wing In Ground Effect Vehicle" filed 24 Jun. 2018. The entire contents of U.S. Provisional Application 62/689,212 "Wing In Ground Effect Vehicle" filed 24 Jun. 2018 are incorporated into this document by reference.

FIELD

The invention relates to self-propelled wing in ground effect craft for sports, recreational and military uses, and other missions.

BACKGROUND

Aircraft and avian wings are subject to parasitic drag which originates at their wingtips. Higher pressure below a wing may slip around the wingtip to a lower pressure region atop the wing, which for a left and a right wing operating as a pair, create two counter-rotating vortices that propagate rearward in cones of expanding diameter. When a wing operates near a surface such as ground or above a body of water, the diameter of the cone is perforce limited and the drag on the wing is reduced. The resulting increase in glide ratio of the craft is called "ground effect."

Aircraft may be designed to lift off from contact with the ground or water and as long as the wings remain low enough to remain in ground effect the aircraft may be propelled using a more modest and economical power source.

A hovercraft creates a pressurized air cushion contained beneath itself to rise above ground or water leaving an air gap around the perimeter of the craft. Air which escapes through the gap is usually replaced by ducted fans drawing air from above or ahead of the craft. These ducts may be shaped so that forward motion of the craft helps scoop air and direct it to support the underside of the craft. The perimeter of a hovercraft usually includes a skirt which helps trap air beneath the craft. Skirts are flexible so as to withstand impacts with uneven ground features or wave crests over water, then return to shape so as to maintain the air cushion. Although perimeter membranes or rims of semi-rigid material may be used, many hovercraft use an inflatable bag skirt. Most hovercraft skirts define an air cushion area mostly or substantially equal to the footprint of the entire craft.

Wing in ground effect vehicles offer the experience of flight but at such very low altitude that the vertical component of velocity in the event of a crash due to collision, loss of power, or novice piloting errors is negligible. They may operate more economically than aircraft aloft, and they do not require the intensive training and licensing procedures for conventional aircraft. Also, because these vehicles are exempt from many of the regulations applied to true flying machines, people precluded from acquiring an aircraft pilot license due to age, visual acuity, and other health conditions may operate and enjoy wing in ground effect vehicles.

BRIEF SUMMARY

A modular wing in ground effect vehicle has a fuselage frame which receives interchangeable cockpit and component modules into predetermined design spaces within the volume designated for interchangeable devices. These modules offer a variety of cockpit configurations such as seating arrangements, and may accept a variety of snap-on wing styles and control surfaces for various flying conditions and pilot skill levels. When depleted or due for repairs, modules containing stored energy components or machinery subject to wear or periodic maintenance may be exchanged for new or replenished units so that a vehicle requiring such an exchange may be returned to service quickly and conveniently.

Thus a first objective of the invention is to provide a wing-in-ground-effect vehicle for sporting, military, and recreational uses. A corollary objective of the invention that the aircraft be easy to control and easy for users to acclimate themselves to its handling characteristics.

Like many other types of sports and recreational machines, another objective of the invention is to provide a vehicle whose flight characteristics may be modified as a novice user gains increasing skill and endeavors to demand greater agility and power from the craft. Such a user will rely on forgiving handling characteristics initially and then later prefer more sensitive and responsive vehicle dynamics. There is wide variation in human body mass, and a corollary objective of the invention is to provide lift surfaces (wings) and control surfaces on modular components which may be detached and exchanged to adjust lifting force to accommodate heavier users or cargo.

The experience of flying in air varies greatly due to weather, temperature, and sunshine upon the ground which, by uneven heating or evaporation of moisture from soil or plants, creates local instabilities such as thermals. It is a yet further objective of the invention to provide a modular, modifiable wing-in-ground-effect vehicle whose flight characteristics may be readily adaptable to a wide variety of flight and weather conditions.

A corollary objective of the invention is to enable flight as a customizable and personalized experience so that people with various and particular needs, shape, strength, size, and interests may select from a variety of modules and build and modify a flight craft to suit their immediate preferences, and then change these selections with ease and convenience as their preferences or interests change, or as one craft is used by each member of a group of users.

Many types of seating arrangements are contemplated within the scope of the invention, and thus an additional objective of the invention is to provide a selection of modular cockpits detachable from and installable onto the vehicle. A corollary objective of the invention is to provide modular instrument clusters for various modes of operation, or specific to the handedness of an operator.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 3b is an exploded view showing components of the configuration of FIG. 3a.

FIG. 4b is an exploded view showing components of the configuration of FIG. 4a.

FIG. 5c is a cross section view of the modular aircraft shown in FIG. 5a.

FIG. 6b shows a front view of the modular aircraft shown in FIG. 6a.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also, the word 'by' may vary in meaning depending upon context; in some cases it is an ablative preposition carrying the meaning of "by means of," while in other contexts it may operate as a locative preposition meaning "adjacent to," "at," or in "proximity of" the noun which it modifies.

Also, the words "operator," "pilot," or "crew" means, interchangeably, any person or persons tasked with the monitoring, control, or movement of a vehicle.

The invention is a wing-in-ground-effect vehicle having modular components for its lift surfaces and control surfaces, and having modular cockpit components or modular subsections assemblable within a cockpit module. In this specification the word "module" refers not only to any of a set of standardized parts or independent units that may be used to construct a more complex structure or to complete or complement a geometrically defined volume, but also any one of a set of detachable and exchangeable components having common exterior geometries or mating features. A product is "modular" when there are no unpredictable elements in the design of its parts, especially in its exterior shape and in the predetermined location and features for mating or assembling the product into a larger entity in which all modules fit together and work together. "Modularity" standardizes the way by which components fit and interact together, especially physically and mechanically, but in the context of the invention, also electric-ally, hydraulically, pneumatically, and aerodynamically.

Figure 1:
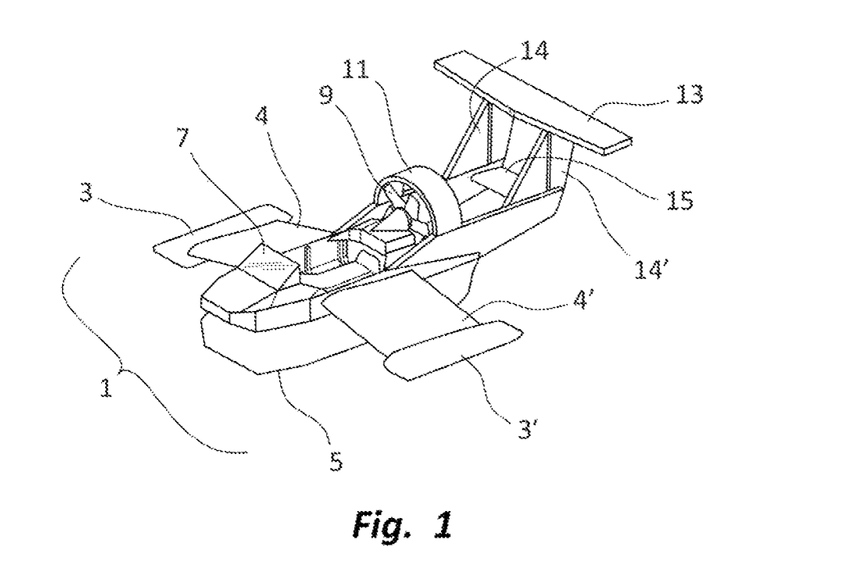
FIG. 1 shows a configuration of a modular aircraft in accordance with the invention.

Referring now to the figures, FIG. 1 shows a configuration of a wing-in-ground-effect vehicle [1] in accordance with the invention. Modular wings [4, 4'] attached to the main fuselage frame also include pontoons [3, 3'] at their tips. In some embodiments these pontoons may be designed for flotation and stability while the craft floats on water, while in others the pontoons may be designed as skids which survive ground contact and sliding along the ground without inducing the craft into a ground loop or severe yaw, and in other embodiments the pontoons may carry extra fuel in the manner of drop tanks, or may function as storage space for other articles or materials.

The craft has an inflatable bag skirt [5] around the main fuselage. A ducted fan [9] resides within a fan shroud [11] designed to radially contain fragments in the event that the fan or impeller assembly disintegrates. A portion of the volume of air drawn by the ducted fan is directed aft to propel the craft forward. Another portion of the drawn air is directed downward to establish and pressurize an air cushion beneath the craft and to inflate the bag skirt which contains the air cushion by its perimeter. Unlike a hovercraft which maintains a static air cushion trapped within the skirt beneath itself, a wing-in-ground-effect vehicle generates a dynamic air cushion primarily comprising high pressure regions beneath its wings and at least laterally contained by end plates or pontoons located at the tips of the wings or spaced at intermediate sites along the wings.

Twin-tail empennage extends aft from the main fuselage frame. Stabilizing and control surfaces include vertical fins with movable rudders [14, 14'] and a horizontal stabilizer [13] which may be fixed within a range of angles of attack to trim the craft at speed. At center aft, between the tails there is an elevator [15] movable by electrical, pneumatic, hydraulic or mechanical commands from one or more controls in the cockpit. The cockpit module shown also comprises a windscreen [7.]

Figure 2:
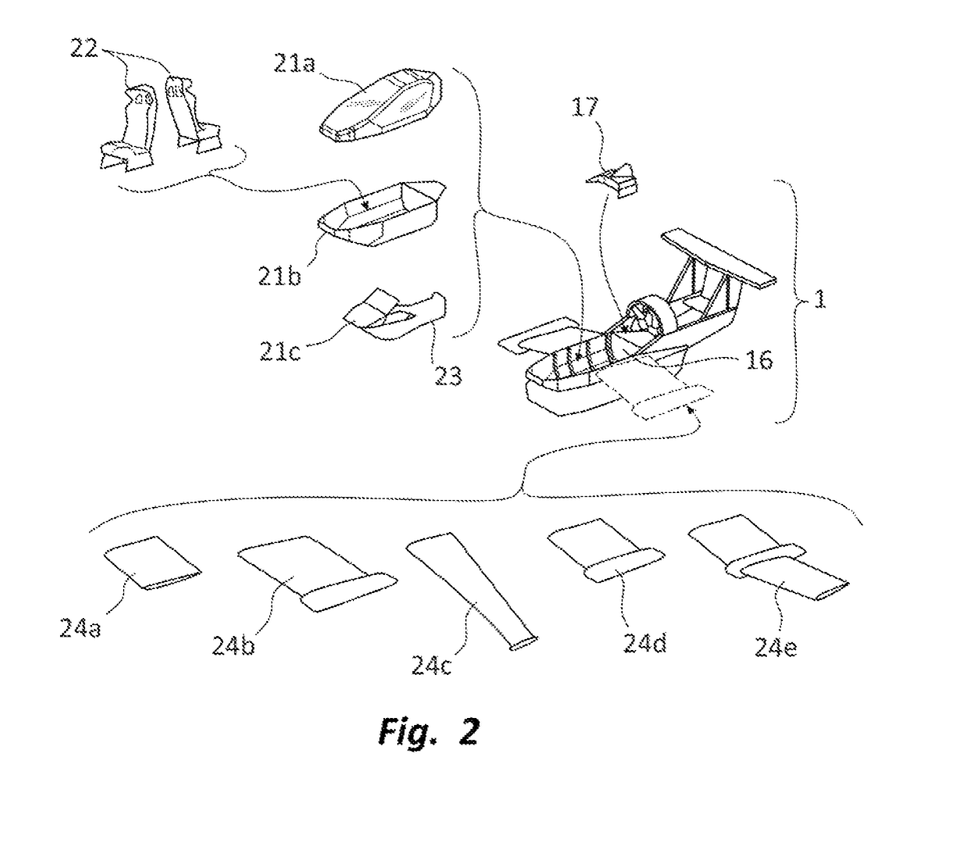
FIG. 2 shows an exploded view of a modular aircraft in accordance with the invention, and several alternative components therefor.

FIG. 2 shows a wider collection of modular components which may be selectively installed to provide various functions, cockpit configurations, and performance characteristics of the craft [1.] These components may be readily swapped out or repositioned as operating conditions change, or as different users prefer different handling characteristics, or as different wing loadings are required for lighter or heavier pilots and passengers, or if the number of people in the craft changes, for adjustment for various limb lengths and body sizes for a diversity of pilot and passengers. The engine is surrounded by heat shields fore and aft [16,] and an engine shroud [17] covers the top. The engine shroud is streamlined and includes a conical fairing which is aligned with and directly ahead of the axis of the fan or impeller.

Of the many types of modular cockpits in accordance with the invention, two are depicted in this figure. One type [21c] includes a central seat [23] in which, like a banana seat of a motorcycle, one or not usually more than two people sit astride. In this modular unit space below the seat may be utilized for storage. This particular cockpit module includes a low-angle windscreen, and an integral instrument cluster not visible from the view angle of the figure.

Another type of modular cockpit [21b] is also shown. This type is more of an open tub shape. Seats [22] may be bolted into the tub. Although the seats shown in this figure are arranged for a pilot and one passenger to be seated back to back, it is also possible to install both seats facing forward. It is also possible to install a pilot's seat and two passenger seats abreast of each other behind the pilot. Although it is not anticipated that the wingspan of the vehicle would meet or exceed 80 feet, larger versions of a craft in accordance with the invention may have a cockpit of this sort having even three or more rows of seats or bench seats. Having all seats facing forward may be a preferred mode of assembly based on users' preferences and comfort.

Also, although the seats in this figure are identical it is also within the scope of the invention to offer seats of various sizes and styling which may be mixed or matched within the cockpit. Thus the invention includes a cockpit tub having bench seats, child-sized seats, light-weight seats comprising slotted metal or perforated material, competition seats having seatbelts with multiple retention points, and deluxe cushioned seats. Another type of seat receives and secures a child safety seat typically used in cars. A pilot or passenger may safely bring along a child when using a seat adapted to secure a child safety seat. Booster seat component modules or physically smaller seats having height adapters are designed to position a smaller person or a person with particularly short limbs at a more advantageous location so that he or she may reach and safely operate vehicle controls, and smaller passengers such as children may sit propped up to enjoy substantially the same view as adult passengers.

A canopy [21a] is also available which conforms to the perimeter contour of the cockpit and the cockpit-receiving portion of the main fuselage. Although it is not necessary to operate the vehicle with a canopy in place, this may be desirable especially since an air cushion vehicle with a bag skirt is prone to kick up dust and small particles on land and spray on water, which most people do not find enjoyable.

A variety of modular wings are available for a craft within the scope of the invention. Although the most common design [24d] includes a tip mounted pontoon for stability and for buoyancy while afloat, other designs are available without a pontoon [24a.] A design having an extended chord length [24b] is also contemplated having more forgiving handling characteristics for novice users or for additional stability in less than optimal weather. A longer wing having a shorter chord length and a forward rake angle [24c] provides responsive handling characteristics preferred in certain sporting uses and for more expert pilots. Lastly, a larger surface-area wing [24e] having an additional chord section extending distally from the pontoon is also contemplated within the invention, to provide extra lift capacity.

Besides yaw and pitch commands issued from the pilot by means of mechanical controls, electronic signals, or pneumatics or hydraulics, significant changes in vehicle attitude may be effected by weight shifts of the pilot. The pilot may move or lean forward or aft in the cockpit to pitch the craft down or up respectively, and may initiate turns by leaning or moving to the left or right within the cockpit. Depending on the style of wings being flown, the craft may either turn in the direction of the pilot's lean or displacement, or they may turn away from the pilot's lean if the opposite, higher wingtip accumulates more parasitic drag and retards the opposite side of the craft.

Figure 3A:
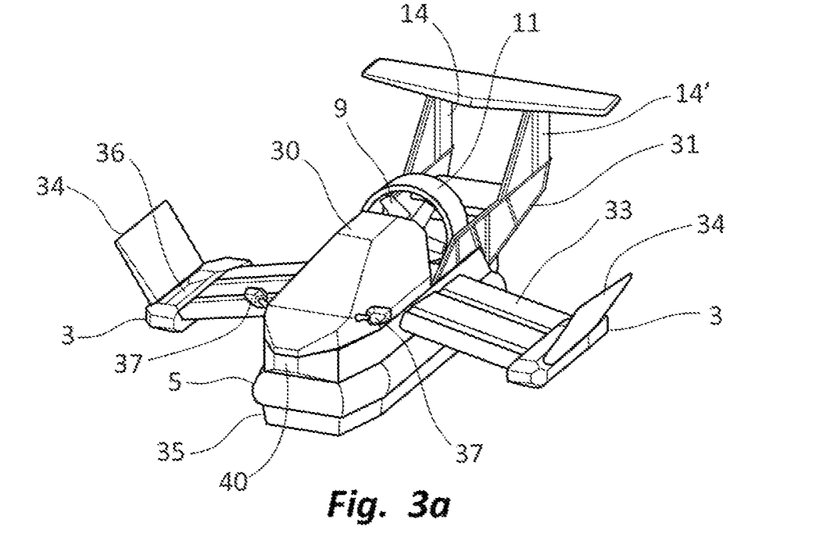
FIG. 3a shows an alternative configuration of a modular aircraft in accordance with the invention.

FIG. 3a shows an alternative embodiment within the scope of the invention. The skirt [5] attaches to the fuselage frame and also has a lower cowling [35] made of a compliant but stiff material which resists wear during ground contact and withstands sliding contacts with sharp objects on the ground that could otherwise puncture a bag skirt. The propulsion module in this embodiment is a fan [9] operating within a duct [11] to supply blade-driven air. Other exchangeable modules incorporate bladed machinery such as a turbofan or a bladed turbine to supply blade-driven air. Also, although Prandtl-style or Tesla-style stacked disc turbines are sometimes called "bladeless" turbines, within the scope of this specification the exhaust leaving the rotors of these devices shall be included within the term "blade-driven air."

The empennage [31] of this configuration includes two vertical control surfaces or rudders [14, 14'] and the attached wings include ailerons [33] as control surfaces, and pontoons [3.] In this embodiment a pontoon is also a storage module. A cover has been removed from the pontoon at starboard to reveal a storage compartment [36.] Other pontoon embodiments may be adapted to store extra fuel and may also be designed to be jettisoned from a wing tip in the manner of drop tanks. Other pontoon modules comprising tanks may receive commands from the cockpit for releasing stored liquids or materials, smoke, or aerosols. These pontoon modules may be used to deliver chemicals on land or water such as for water treatment or agricultural use without greatly disturbing the surface of the water or the crops being traversed. Colored smoke or pyrotechnic effects may be deployed for spectator entertainment such as in aerobatic expositions, and smoke for obscuring vision or materials having obnoxious odors or uncomfortable effects may be deployed in military operations or for crowd suppression. The cockpit module [30] shown includes sport mirrors [37] or rear-view mirrors.

Outboard of the pontoons are wing extensions [34] which in accordance with some pontoon modules may be affixed at various desired angles with respect to the wing and the ground or water surface. When attached at a low angle, these extensions provide additional lift and may operate within effective ground effect themselves. When attached at higher angles, the extensions form a dihedral which increases roll and yaw stability for novice pilots or marginal operating conditions, and they also act as ailettes for reducing wing-tip vortices.

Lastly in this figure, a nose module [40] is affixed to the front of the fuselage frame. A nose module may offer an aeronautical or streamlined shape to reduce drag as the moving craft penetrates the air ahead of it, but it may also include internal, mission specific avionics for various purposes such as navigation, sensors, lighting for illumination or signaling, horns or loudspeakers, identification or location transponders, sensors for depth or the location of fish, biological matter, or mineral deposits, range-finding and target acquisition systems, and forward-facing weapons.

Figure 3B:
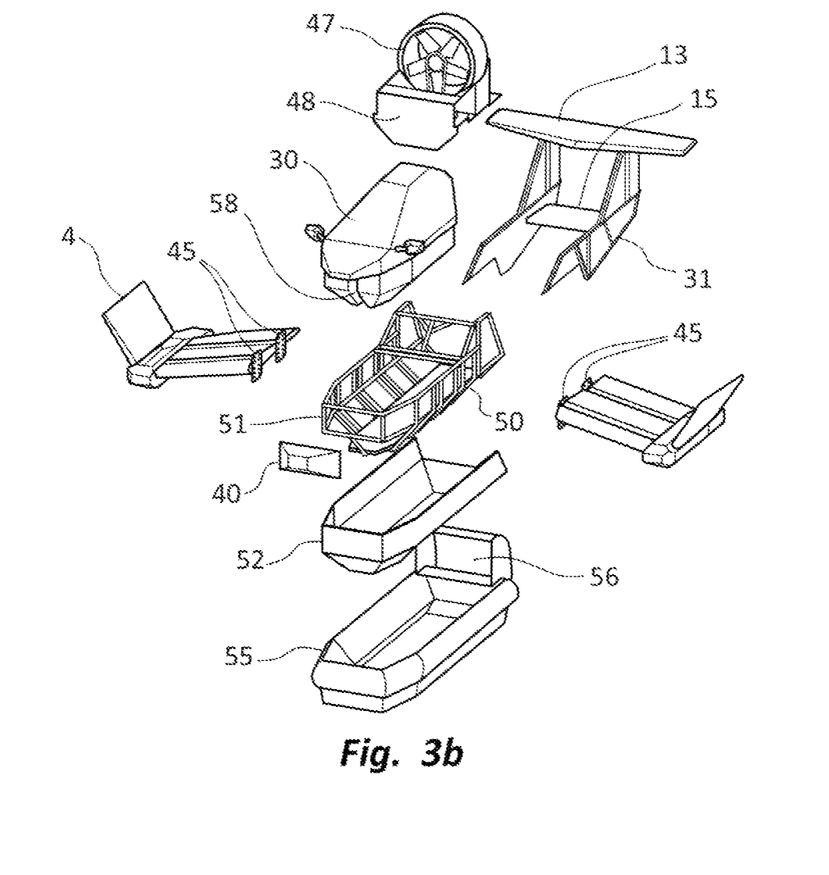

FIG. 3b is an exploded view showing components of the configuration of FIG. 3a. The fuselage frame [50] has various modules attached to it which shall be explained here. Modularity is the degree to which a system's components may be separated and recombined, often with the benefit of flexibility and variety in use. The concept of modularity is used primarily to reduce complexity by breaking a system into exchangeable components having varying degrees of interdependence and independence, and may also seek to reduce the apparent complexity of each part by presenting the user with abstractions and common interfaces. Complex subsystems may be understood and managed using simpler processes, and the benefits of enjoyment of flight near or above ground can be experienced and enjoyed, or leveraged for other benefits as determined by and configured for any individual user and the activity it is desired to perform or experience. Thus it is understood that the modularity of the inventive wing-in-ground-effect vehicle allows for many more operable configurations of the craft than can be illustrated in this document.

A nose module [40] as explained above is affixed to the forward facing portion of the fuselage frame. A floor module [52] is attached therebelow, and a bag skirt [55] as a module is attached below the floor. Bag skirts are subject to abrasive wear, puncture wounds, and lacerations due to ground contact at speed and unexpected but unavoidable contacts with sharp edged or pointed objects or debris on the ground. It is therefore convenient that the invention provides an easily exchangeable bag skirt. The bag skirt includes an intake duct [56] that intercepts a portion of the blade-driven flow stream generated by the propulsion module [47.] The propulsion module includes a firewall [48.]

The cockpit module [30] seats within the frame, and includes a slot section [58] which fits closely over a septum [51] defined within the fuselage frame for increased lateral rigidity of the assembly. The empennage [31] includes movable rudders and horizontal surfaces [13, 15] of which one or both may also be moveable to act as horizontal control surfaces. All moveable and horizontal surfaces of the empennage are modular and replaceable or exchangeable for various operating conditions or preferences of styling. Wings [4] are attached to the fuselage frame by means of wing receiving struts [45.] The struts may be permanently incorporated into the wing, or they may be separable struts which are rigidly affixed to the fuselage frame first, and then modular wings may be exchangeably affixed to the struts.

Figure 4A:
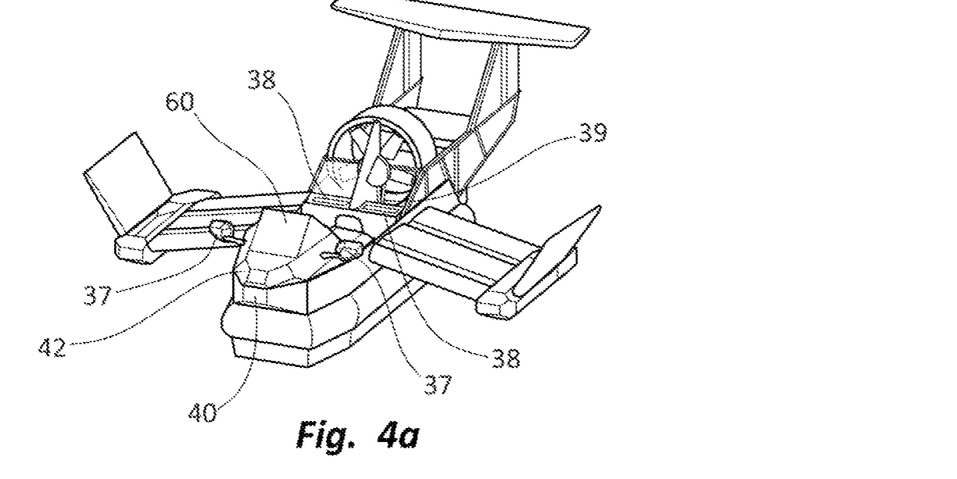
FIG. 4a shows another alternative configuration of a modular aircraft in accordance with the invention.

FIG. 4a shows another alternative configuration of a modular aircraft in accordance with the invention. An open cockpit [60] of a sporty design has rear-view or sport mirrors [37] affixed closer together, resembling motorcycle styling or other vehicles controlled by handlebars. A cockpit featuring fixed or moveable handlebars and controls affixed thereon is also contemplated within the scope of the invention. The cockpit has its own forward avionics compartment [42] which may enhance or cooperate with the functions of other avionics contained within the nose module [40.] Various avionics devices may be included into the cockpit module or specific, swappable avionics modules, or both, such as for redundancy. Typical avionics systems which may be included in such modules include a variometer, an altimeter, an airspeed indicator, a fuel level gauge, a pressure gauge, a thermometer, an attitude indicator, a compass, a clock, a heading indicator, a level, a roll indicator, a trim indicator, a voltmeter, an ammeter, a tachometer, and a rate of turn indicator.

The propulsion module in this version of the vehicle is a belt-driven fan with a motor beneath and a drive belt [39] connecting the motor to the fan by a sheave. Silent chain and sprockets may also be used to transmit power from a motor or engine to a propeller shaft of a propulsion module. An electric motor is driven by exchangeable fuel cells [38] received into the propulsion module or a midships module received into the fuselage frame ahead of an after module which in this configuration is the propulsion module. Depleted fuel cells may be exchanged with fully energized cells even while the vehicle is in motion. Although rechargeable fuel cells may be a preferred option, allowing depleted cells to by re-energized while others are in use in the vehicle, fuel cells may also be designed as single-use disposable units discarded at whim as they are consumed and replaced with fresh cells.

Figure 4B:
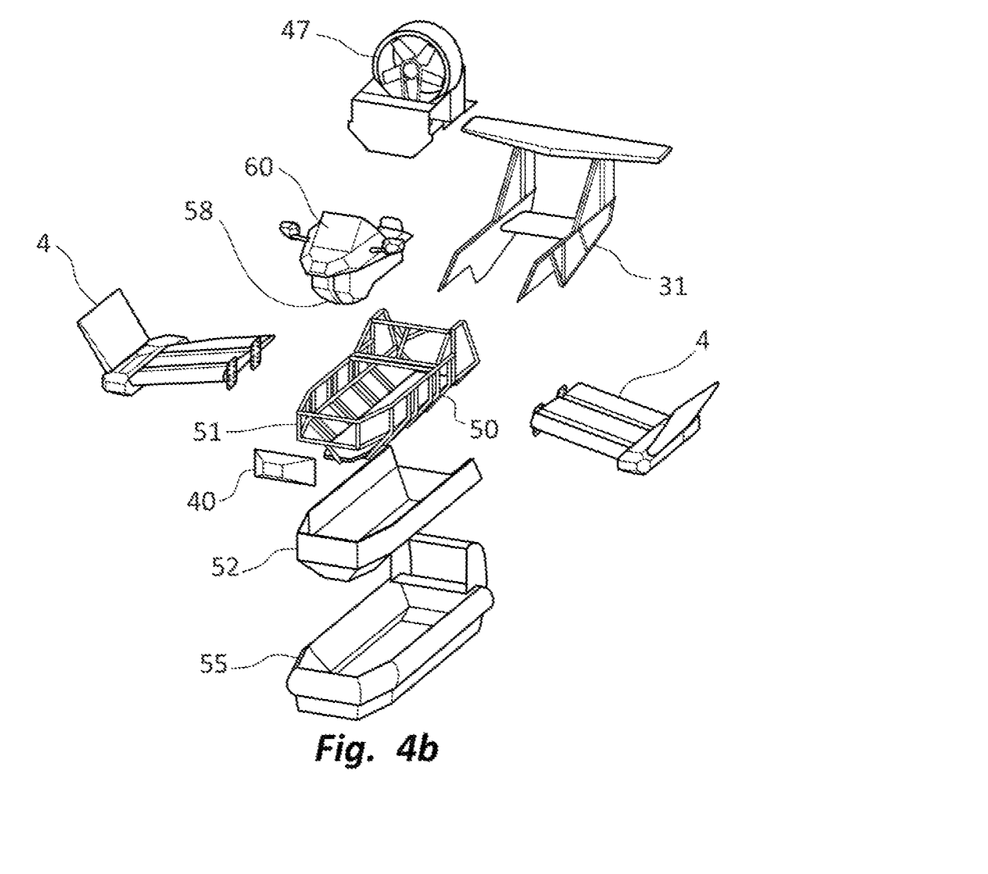

FIG. 4b is an exploded view showing components of the configuration of FIG. 4a. As in FIG. 3b, a nose module [40] affixes to a forward facing portion of the fuselage frame [50] and a floor module [52] is attached therebelow, and a bag skirt [55] as a module is attached below the floor. Wings [4] are received onto wing receiving struts which are attached to the fuselage frame. An empennage [31] also attaches to the frame, and a propulsion module [47] is received into the frame as an after module. A propulsion module may also be large enough to mate with and be received into the fuselage frame space dedicated to the sum of a midships module and an after module. The fuselage frame defines three modular spaces or recesses: a cockpit module, a midships module, and an after module. Each module is defined with physical attachment locations and criteria, and other location and interconnection criteria for data transmission, electric power, hydraulics, pressurized fluids, physical control linkages such as for linking vehicle controls in a cockpit module with motor controls in a propulsion module and control surfaces in the empennage and the wings. Other cockpit controls may open pontoon tanks to drop fuel as is customary before a military engagement, or the tanks may deliver agricultural chemicals such as insecticides or fertilizers over a crop field, or water treatment chemicals or aquatic nutrients over a body of water. Pontoons for military or tactical use may deliver ordnance or house weapons such as missiles or cannons, or devices for generating chaff, obscuring smoke, or the like.

A cockpit module may also be designed to be received into at least a combined volume of a forward module-receiving recess and a midships module-receiving recess. An after module-receiving recess may be located abaft of the midships module-receiving recess. A motor for fan propulsion, a storage module having a storage compartment, or a battery, a fuel tank, or a fuel cell may also be received into a module-receiving recess.

Figure 5A:
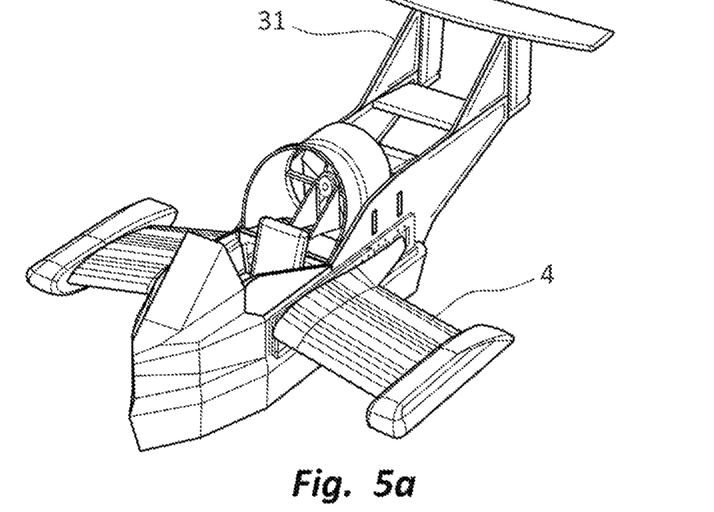
FIG. 5a shows another alternative embodiment of a modular aircraft in accordance with the invention.

FIG. 5a shows another alternative embodiment of a modular aircraft in accordance with the invention. This version comprises larger and flatter ram wings [4,] which have larger end plates to contain the dynamic air cushion and a larger T-shaped empennage [31.] A ram wing is typically an airfoil flying close enough to the ground to take advantage of wing-in-ground-effect phenomena and also includes large endplates to prevent the lateral escape of air pressurized beneath the wings. The plates also intercept and minimize parasitic drag created by wing tip vortices. Substantial efficiency is gained by the reduction of wingtip drag, which directly improves the lift versus drag ratio which is a parameter often referred to as L/D.

Although a smaller tail may be effective for aircraft whose airfoils and lift generating surfaces operate more stably, larger tail modules are also contemplated within the scope of the invention especially for use by novice users. Modularity of these tail structures allows for simple and rapid exchange from one tail type to another.

Variable wing geometry mechanisms are also contemplated within the scope of the invention, whereby wing struts or other components within the wing chord change some dimensions of the chord, such as its height, length, curvatures, angle of attack, or any combination of these to adjust performance parameters such as trim, lift, drag, or glide ratio, while in flight.

Figure 5B:
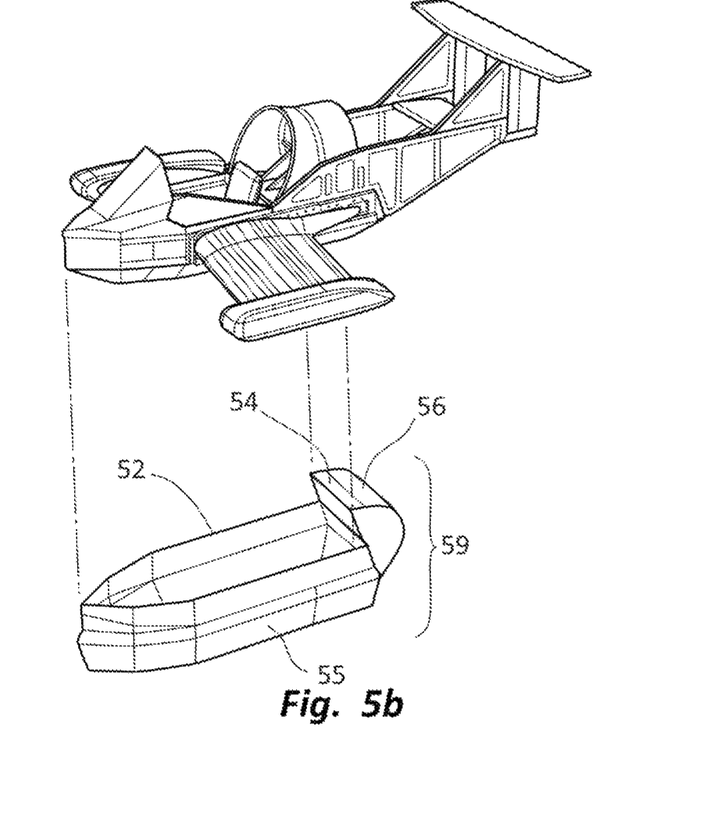
FIG. 5b shows the modular aircraft of FIG. 5a with its bag skirt separated.

FIG. 5b shows the modular aircraft of FIG. 5a with its bag skirt assembly [59] separated from the rest of the modular assembly of the craft. In this view it is seen that the skirt assembly [55] further comprises a v-hull which includes interior membranes [52] which continue up to the gunwhales of the hull. Integral to the skirt assembly is a diverter [56] including a movable plenum [54] for catching a portion of blade-driven air flow volume passed through the propulsion fan. The diverted air may be used for inflation of the skirt, or for pressurizing the air cushion retained within the skirt, or for both of these functions. Variation of the fraction of air caught by the diverter may be accomplished by means a moveable plenum coupled to the diverter by a hinge, but in a preferred embodiment, the plenum is not a rigid element coupled to the rest of the diverter by a hinge, but may also be manufactured as a flexible membrane portion integral to the skirt itself which may have its intake cross sectional area adjustable by stretching membrane portions into larger or smaller intake shapes. These may be rectangular intake cross sections or elliptical or round intake shapes, all adjustable by control of a pilot. The diverter may thus operate as a variable cross section intake funnel located downstream of the propulsion fan.

Figure 5C:
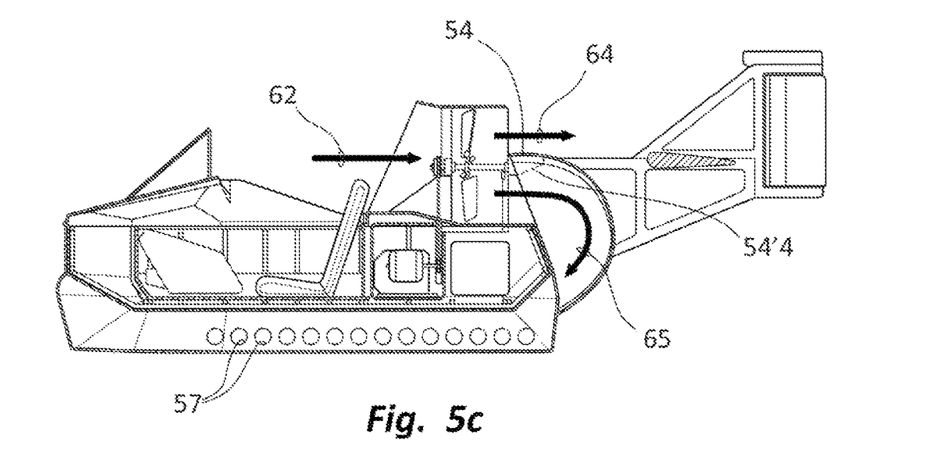

FIG. 5c is a cross section view of the modular aircraft shown in FIG. 5a. Air flow [arrow 62] inducted through the propulsion fan becomes blade-driven air which is split by a moveable plenum [54] into a first flow portion [arrow 64] allowed to bypass the diverter and develop thrust for the craft, and a second flow portion [arrow 65.] According to one bag skirt assembly within the invention, the diverter may collect up to 60% of flow volume passing thru propulsion fan. Diverted air inflates and stiffens the bag skirt and also increases the air gap between the underside of the skirt and the surface being traversed, which allows for smoother operation at higher speeds and makes the craft less susceptible to adverse yaw when contacting wave tops while operating over water or contacting surface irregularities or small obstacles while operating on land. The movable plenum is shown in phantom line [54'] to illustrate an alternate position for diverting less propulsion air to the skirt and diverting more air for thrust.

The internal periphery of the bag skirt also includes a plurality of ports [57] communicating between the inflated lumen of the periphery of the bag skirt to the main volume of the air cushion contained beneath the craft. Ports may also be created by incisions made in the bag skirt which also allow pressurized air to pass from the inflated lumen of the periphery of the bag skirt to the main air cushion. Alternatively, a port may further comprises a membrane operating as a flapper valve to retain higher air pressure in the bag skirt lumen, which aids to prevent water or foreign matter from entering into the bag.

Figure 5D:
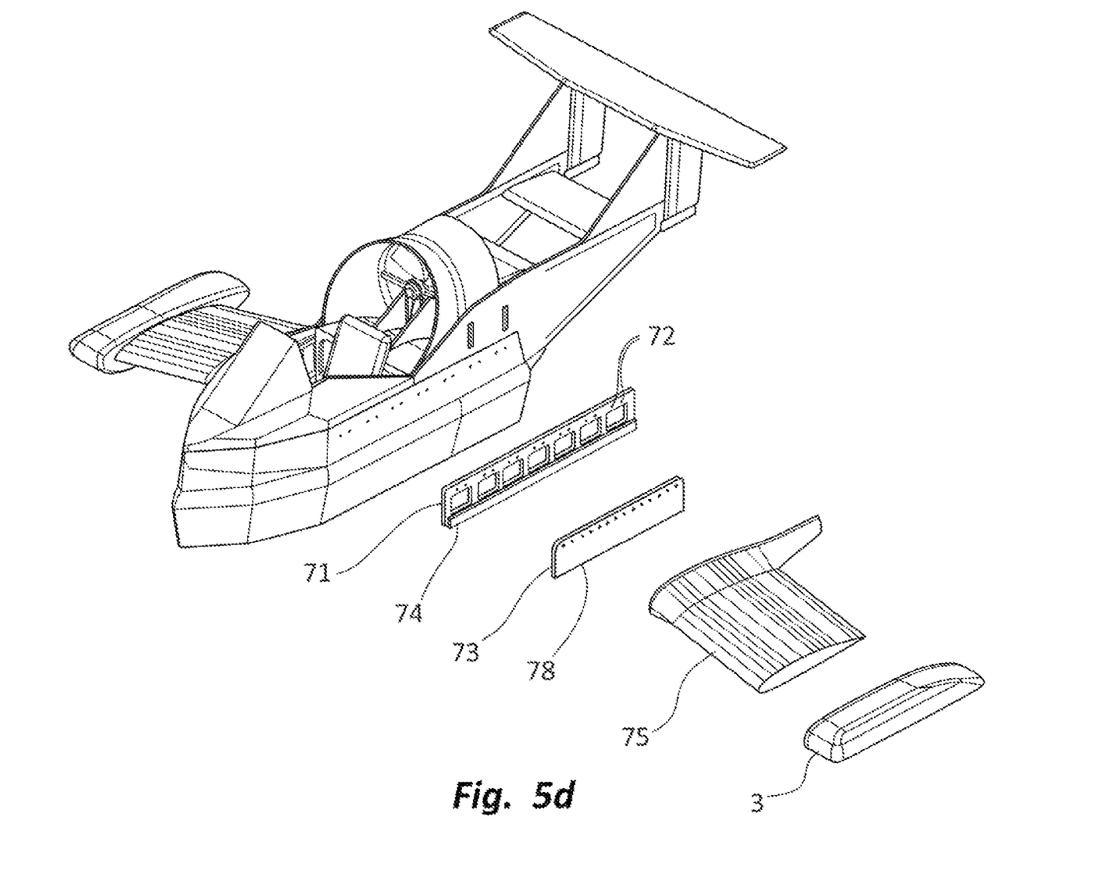
FIG. 5d shows another alternative embodiment of a modular aircraft in accordance with the invention, with some components of its wing module shown exploded.

FIG. 5d shows another alternative embodiment of a modular aircraft in accordance with the invention, with some components of its wing module shown exploded for review. The fuselage has a wing-receiving plate [71] affixed to it, and this plate includes an array of holes [72] for receiving fasteners in a range of positions which in this embodiment shown is a linear array of holes capable of securing a wing module in various forward-mounted, aft-mounted, and intermediate positions along the fuselage.

The wing-receiving plate further comprises a channel section [74] or a flange to mechanically support a lower edge [78] of a root plate [73] of a modular wing assembly received into therein. The root plate also includes an array of holes which in this embodiment is also a linear array of holes. Besides linear arrays of holes, other pluralities of repeated hole patterns may be incorporated into a root plate or the wing-receiving plate to allow adjustments for angle of attack or other wing chord shape parameters. Also, hole patterns in the root plate or the wing-receiving plate may receive fasteners or locating pins as well, and may be irregular or staggered so that a manufacturer may enforce certain preferred or mandatory wing configurations, or exclude configurations known or deemed to be unsafe, undesirable, or unsports-manlike. A wing chord section [73] adjustably mounts to the root plate, and a pontoon [3] or end plate mounts to the wing tip.

Figure 5E:
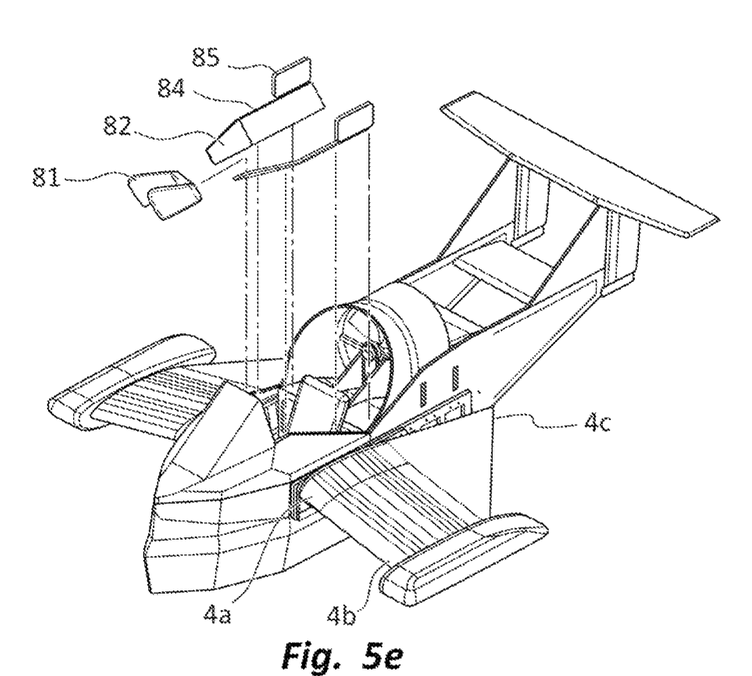
FIG. 5e shows another alternative embodiment of a modular aircraft in accordance with the invention, having a Lippisch wing planform.

FIG. 5e shows another alternative embodiment of a modular aircraft in accordance with the invention, with this version having a Lippisch wing planform. The Lippisch design is a delta plan comprising an anhedral and a larger chord length at root than at the wing tip. This wing is also called a reversed delta plan because the leading edge at the tip [4b] is forward of the leading edge of the root [4a] when installed on craft. The wing trailing edge at its root [4c] nearly touches the ground or water surface, which serves to further lift the tail section.

Also shown exploded in this view are pads disposed within the cockpit module on both sides [82, 84, 85] and ahead [81] of the pilot for collision safety and for comfort in a rather confined space, especially during turbulence or aggressive maneuvers. This vehicle embodiment does not require a tail elevator, although it has steerable rudders [32] as its empennage.

Figure 6A:
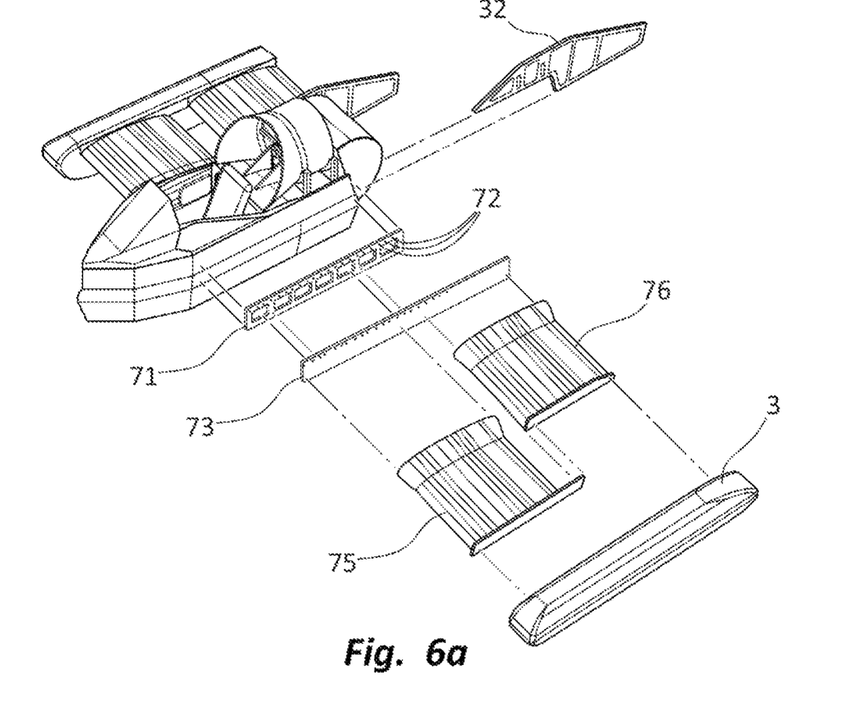
FIG. 6a shows another alternative embodiment of a modular aircraft in accordance with the invention having tandem wings, with some components of its tandem wing module shown exploded.

FIG. 6a shows another alternative embodiment of a modular aircraft in accordance with wing modules having a tandem wings, with some components of its tandem wing module shown exploded for review. This embodiment is a tandem or canard version comprising two nearly equal forward [75] and rear [76] wing pairs. The forward wings are set at slightly greater angle of attack than the rear wing, which eliminates the need for any type of a tail section. This configuration is intended primarily for above water use more than above ground use, and may be best suited for ice surfaces such as frozen lakes.

When operating a vehicle having this configuration, if a pilot were to pitch the craft forward accident-ally, then the nose of the craft may contact the water and rebound, or skip or plane off the water, and the vehicle will recover and resume normal ground-effect flight.

As explained for the configuration shown in FIG. 5d, the fuselage of the embodiment shown in this figure also has a wing-receiving plate [71] affixed to it, with the plate including an array of holes [72] for fasteners in a range of positions. The wing-receiving plate further comprises a channel section [74] or a flange to mechanically support a lower edge of a root plate [73] of a modular tandem wing assembly received into therein. The root plate also includes an array of holes which in this embodiment is also a linear array of holes. Both tandem wing tips join to a pontoon [3.]

Figure 6B:
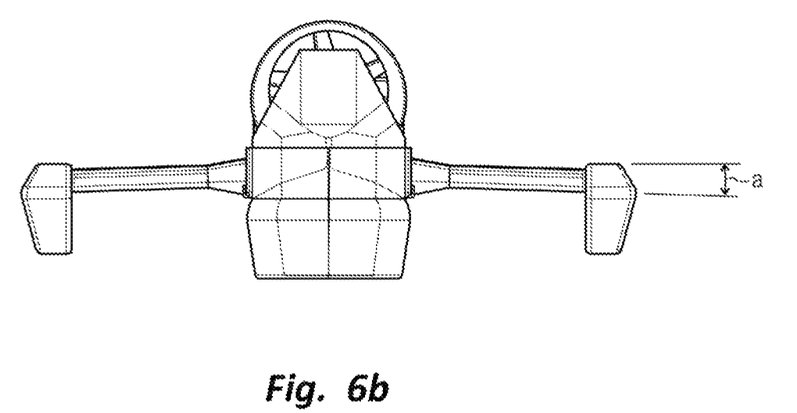

FIG. 6b shows a front view of the modular aircraft shown in FIG. 6a. The inside surfaces of the pontoons act as end plates trapping the air rammed beneath the ring by forward motion of the craft. The trapped air is at higher pressure than the air above the wing, which is rarified by the Bernoulli effect of the longer chord length atop the wing, and the end plates prevent the pressurized air from escaping laterally and dissipating the lift-generating low-pressure regions of air atop the wing. This view also shows then anhedral, or downward angle [a] of the wings.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise.

Consequently and in summary, although many exemplary embodiments are described above, it will be appreciated that the invention is intended to cover all modifications and equivalents within the scope of the following claims.

What is claimed is:

1. A modular wing-in-ground-effect vehicle comprising:
a propulsion module providing blade-driven air,
a fuselage frame defining
a forward module-receiving recess and a midships module-receiving recess abaft thereof,
an underside surface and
a duct intercepting at least a portion of said blade-driven air and communicating with said underside surface,
with said fuselage further comprising at least two wing-receiving plates,
a skirt mounted around a perimeter of said underside surface, and
an empennage with at least one moveable horizontal surface and at least one moveable rudder.

2. The modular wing-ground-effect vehicle of claim 1, further comprising a cockpit module received within at least said forward module-receiving recess.

3. The modular wing-ground-effect vehicle of claim 2, wherein said cockpit module further comprises at least one seat.

4. The modular wing-ground-effect vehicle of claim 3, wherein said cockpit module further comprises at least one rearward facing seat.

5. The modular wing-ground-effect vehicle of claim 2, wherein said cockpit module further comprises at least a first seat abreast of a second seat.

6. The modular wing-ground-effect vehicle of claim 2, wherein said cockpit module is received into at least a combined volume of said forward module-receiving recess and said midships module-receiving recess.

7. The modular wing-ground-effect vehicle of claim 2, wherein said cockpit module further comprises an instrument selected from the set of instruments consisting of:
a variometer, an altimeter, an airspeed indicator, a fuel level gauge, a pressure gauge, a thermometer, an attitude indicator, a compass, a clock, a heading indicator, a level, a roll indicator, a trim indicator, a voltmeter, an ammeter, a tachometer, and a rate of turn indicator.

8. The modular wing-ground-effect vehicle of claim 1, further comprising an after module-receiving recess located abaft of said midships module-receiving recess.

9. The modular wing-ground-effect vehicle of claim 1, further comprising a motor received into a module-receiving recess.

10. The modular wing-ground-effect vehicle of claim 1, further comprising a battery received into a module-receiving recess.

11. The modular wing-ground-effect vehicle of claim 1, further comprising a fuel tank received into a module-receiving recess.

12. The modular wing-ground-effect vehicle of claim 1, further comprising a fuel cell received into a module-receiving recess.

13. The modular wing-ground-effect vehicle of claim 1, wherein at least one module received into a module-receiving recess further comprises a storage compartment.

14. The modular wing-ground-effect vehicle of claim 1, further comprising a wing having a pontoon.

15. The modular wing-ground-effect vehicle of claim 14, wherein said pontoon further comprises a storage compartment.

16. The modular wing-ground-effect vehicle of claim 14, wherein said pontoon further comprises a storage tank.

17. The modular wing-ground-effect vehicle of claim 1, wherein said skirt further comprises a diverter for catching a portion of said blade-driven air for inflation of said skirt.

18. The modular wing-ground-effect vehicle of claim 17, wherein said diverter comprises a movable plenum.

19. The modular wing-ground-effect vehicle of claim 18, wherein said plenum is a rigid element coupled to said the diverter by a hinge.

20. The modular wing-ground-effect vehicle of claim 18, wherein said plenum is a flexible membrane integral to said skirt.

* * * * *